United States Patent [19]
Ho et al.

[11] Patent Number: 5,970,070
[45] Date of Patent: Oct. 19, 1999

[54] COMMUNICATION CONTROLLERS AND METHODS THEREFOR

[75] Inventors: Kin M. Ho, Fremont; David C. Banks, Pleasanton; John C. Schell, Sunnyvale; Tai Quan, San Jose; Teshager Tesfaye, Mountain View; Kenneth A. Schmahl, San Jose; Matthew J. Tedone, Sunnyvale; Drew G. Doblar, San Jose, all of Calif.

[73] Assignee: Sun Microsystems, Inc., Palo Alto, Calif.

[21] Appl. No.: 08/915,286

[22] Filed: Aug. 20, 1997

[51] Int. Cl.[6] ..................................................... H04J 3/02
[52] U.S. Cl. ............................................ 370/462; 370/465
[58] Field of Search .................................... 370/278, 296, 370/276, 247, 419, 420, 465, 462

[56] References Cited

U.S. PATENT DOCUMENTS

| | | | |
|---|---|---|---|
| 4,994,909 | 2/1991 | Graves et al. | 358/86 |
| 5,841,997 | 11/1998 | Bleiweiss et al. | 395/311 |
| 5,848,251 | 12/1998 | Lomelino et al. | 395/309 |

Primary Examiner—Chi H. Pham
Assistant Examiner—Kim T. Nguyen
Attorney, Agent, or Firm—Beyer & Weaver, LLP

[57] ABSTRACT

A method, in a host adapter circuit configured for coupling a host electronic device with one of a fiber channel loop and a point-to-point communication channel, for receiving data at the host adapter circuit from one of the fiber channel loop and the point-to-point communication channel. The method includes providing a selectable control signal configured for indicating whether the host adapter circuit is coupled to the fiber channel loop or the point-to-point communication channel. The method further includes providing a front-end receive circuit. The front-end receive circuit is configured for coupling with an input data port. The input data port represents one of the fiber channel loop and the point-to-point communication channel. The method also includes coupling the front-end receive circuit with the selectable control signal. Additionally, the method includes coupling an output of the front-end receive circuit with a decoder of the host adapter circuit, wherein the front-end receive circuit is configured to process, responsive to the selectable control signal, either fiber channel loop data from the fiber channel loop or point-to-point data from the point-to-point communication channel from the input data port to provide parallel data having a predefined size to the decoder circuit.

21 Claims, 8 Drawing Sheets

POINT-TO-POINT

COMMUNICATION CONTROLLERS AND METHODS THEREFOR

CROSS REFERENCE TO RELATED PATENT APPLICATIONS

This patent application is related to the following copending, commonly assigned patent application, the disclosures of which is incorporated herein by reference in its entirety.

"FIBER CHANNEL LOOP ARBITRATION AND COMMUNICATION CONTROL," (Attorney Docket No. P1802/SUN1P111), filed on even date by Ho et al.

BACKGROUND OF THE INVENTION

This invention relates generally to methods and apparatus for data communication to and from a host electronic device. More particularly, the present invention relates to improved communication controllers, and methods therefor, that are capable of facilitating data communication to and from a host electronic device in either the fiber channel loop mode or the point-to-point mode.

Fiber channel loops and point-to-point are two different methodologies by which a host electronic device, e.g., a host computer system, can communicate with other electronic devices, e.g., other computer systems, peripherals, or the like. Fiber channel loops, essentially data-carrying fiber optic channels, have in recent times become the popular communication channels for exchanging data among electronic devices, such as between a computer and its peripheral devices and/or other computers in a network. By way of example, a fiber channel loop may be employed to communicate between a host computer system and its disk drives, among the disk drives, or even to carry internet protocol (IP) data.

With reference to FIG. 1, a block diagram is shown of a host computer system 100, representing a computer which may be employed with a fiber channel loop or to facilitate point-to-point communication. In general, host computer system 100 typically includes a bus 102 for communicating information among its subsystems and/or with the outside world. A host processor 104 is coupled with bus 102 for processing data and instructions. A computer readable volatile memory unit 106 (e.g. random access memory unit) may be coupled with bus 102 for temporarily storing data and instructions for host processor 104 and/or other subsystems of host computer system 100. A computer readable nonvolatile memory unit 108 (e.g., read-only memory unit) may be coupled with bus 102 for storing nonvolatile data and instructions for host processor 104.

To provide high-capacity, nonvolatile storage, a computer readable data storage device 110 such as a magnetic or optical disk may also be provided. Data may be displayed to the user via a display device 112, which is coupled to bus 102 and may represent, for example, a liquid crystal device, cathode ray tube, or other display device suitable for creating graphic images and alphanumeric characters recognizable to the user. Components of host computer system 100 and its variants are well known to those skilled and will not be elaborated further here for brevity's sake.

To facilitate discussion of the fiber channel loop communication methodology, FIG. 2A shows a block diagram of a prior art host adapter card 114 suitable for use with host computer system 100. Host adapter card 114, which may for example be coupled with bus 102 of the computer system of FIG. 1, represents the interface circuit between host computer system 100 with a fiber channel loop 117. As shown, host adapter card 114 includes a communication controller 116 (typically in the form of a serial optical controller), which facilitates communication between host computer system 100 and nodes 118, 120, and 122 via fiber channel loop 117. Nodes 118, 120, and 122 include devices 124, 126, and 128 respectively.

Communication over fiber channel loop 117 is typically achieved in the serial domain, i.e., data frames are transmitted serially on the fiber channel loop. Accordingly, it is typically the case that only one node on fiber channel loop 117 may transmit at one time. To gain access to fiber channel loop 117 for transmission purposes, each device on the fiber channel loop must arbitrate for access. By way of example, communication controller 116 of host adapter card 114 may be employed to arbitrate on behalf of host computer system 100. Techniques of implementing automatic arbitration and communication control have been described in the aforementioned co-pending patent application (Attorney Docket No. P1802/SUN1P111). Generally speaking, once arbitration is won, communication controller 116 may send an OPEN primitive to the target device via the loop to ready the target device for data receipt. Host computer 100 may then employ communication controller 116 to send data to the target device. On the loop, data is typically transmitted at the rate of about 1.06 Gbits/second in four-byte primitive chunks. Communication is terminated, in general, when communication controller 116 sends a CLOSE primitive to the target device to return the target device and communication controller 116 to the MONITOR state. If devices 124 and 128, for example, are in communication while communication controller 116 is in the MONITOR state, data transmitted between these two devices may merely pass through communication controller 116 without being acted upon.

Point-to-point communication, on the other hand, requires no such arbitration. To facilitate discussion, FIG. 2B illustrates the point-to-point communication methodology wherein host computer 100 is connected to a target device 150 via a point-to-point host adapter circuit 152. Target device 150 in turns communicate with host computer 100 via a point-to-point host adapter circuit 154 as shown. Since the connection is dedicated, there is no need for arbitration. Accordingly, there is little latency between the time host device 100 wishes to begin communication and the time data transmission actually begins. Generally speaking, data is transmitted serially over point-to-point channel 156 in the point-to-point technique. As can be appreciated, the point-to-point communication methodology does not require the pass-through capability of the fiber channel loop mode since the dedicated point-to-point communication channel is not shared by other devices for communication without involving host device 100.

In the past, point-to-point controller 152 and communication controller 116 are typically separate devices, implemented on separate cards. As host computer 100 becomes more sophisticated, however, it becomes clear that host computer 100 may sometime be expected to able to communicate in either or both techniques (i.e., point-to-point and/or fiber channel loop). In this situation, the user of host computer 100 would typically be expected to purchase both point-to-point controller 152 and communication controller 116 and swap them as necessary depending on which communication technique is currently employed.

As can be appreciated, this is an expensive option as it forces the user of host computer 100 to purchase, maintain, and periodically update both controllers. Additionally, it is inconvenient to require users to open up the host computer and swap controllers (which are typically implemented as plug-in cards into the bus of the host computer). In the hands of inexperienced users, the swapping operation may endanger the host computer or even the user himself.

In view of the foregoing, there are desired improved communication controllers, and methods therefor, that are capable of facilitating data communication to and from a host electronic device either in a fiber channel loop mode or a point-to-point mode. The improved communication controller preferably implements the dual-mode communication capability in a single communication controller circuit, or even a single chip, thereby reducing costs to the user while improving usability.

SUMMARY OF THE INVENTION

The invention relates, in one embodiment, to a method, in a host adapter circuit configured for coupling a host electronic device with one of a fiber channel loop and a point-to-point communication channel, for receiving data at the host adapter circuit from one of the fiber channel loop and the point-to-point communication channel. The method includes providing a selectable control signal configured for indicating whether the host adapter circuit is coupled to the fiber channel loop or the point-to-point communication channel. The method further includes providing a front-end receive circuit. The front-end receive circuit is configured for coupling with an input data port. The input data port represents one of the fiber channel loop and the point-to-point communication channel. The method also includes coupling the front-end receive circuit with the selectable control signal. Additionally, the method includes coupling an output of the front-end receive circuit with a decoder of the host adapter circuit, wherein the front-end receive circuit is configured to process, responsive to the selectable control signal, either fiber channel loop data from the fiber channel loop or point-to-point data from the point-to-point communication channel from the input data port to provide parallel data having a predefined size to the decoder circuit.

In another embodiment, the step of providing the front-end receive circuit further includes coupling a first clock signal with a point-to-point receive circuit of the front-end receive circuit. The first clock signal represents a clock signal obtained from the input data port. The step of providing the front-end receive circuit further includes coupling an input of a point-to-point receive circuit with the input data port for receiving the point-to-point data when the host adapter circuit is coupled to the point-to-point communication channel. There is also included coupling an output of the point-to-point clock out circuit with a first multiplexer of the front-end receive circuit, wherein the point-to-point receive circuit is configured to clock out the point-to-point data to the first multiplexer once every clock cycle of the first clock signal.

These and other advantages of the present invention will become apparent upon reading the following detailed descriptions and studying the various figures of the drawings.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 3A:
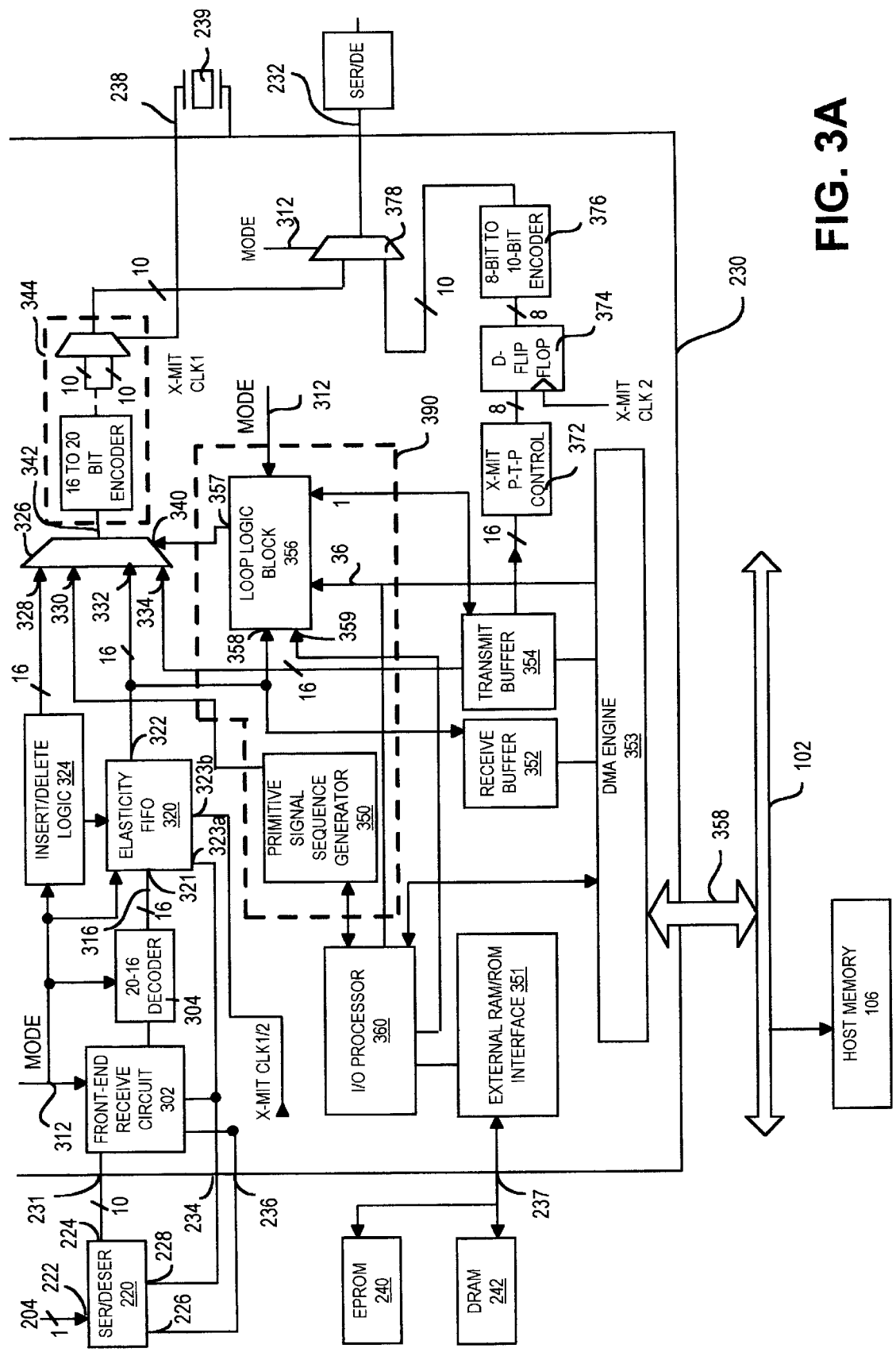
FIGS. 3A and 3B illustrate, in accordance with one embodiment of the present invention, an improved dual mode communication controller.

To further illustrate the features and advantages of the present invention, FIG. 3A depicts, in accordance with one embodiment of the present invention, a block diagram of a dual-mode communication controller (DMCC) 230, representing a dual-mode communication controller that is capable of implementing communication in either the fiber channel loop mode or the point-to-point mode. In the preferred embodiment, DMCC 230 is implemented using an Application Specific Integrated Circuit (ASIC) chip although any other suitable implementation is equally acceptable. As shown in FIG. 3A, DMCC 230 is coupled at its left hand side to a conventional serializer/deserializer (SER/DE) circuit 220, whose function is to translate the serial data frames received from input 204 into parallel 10-bit data input 231. Input 204 may represent, for example, either a fiber channel loop or a dedicated point-to-point communication channel. SER/DE circuit 220, although typically provided as a separate circuit, may, in some cases, be implemented as part of DMCC 230 itself.

Irrespective whether input 204 is coupled to a fiber channel loop or a point-to-point communication channel, the 10-bit output from SER/DE circuit 220 is input into a front-end receive circuit 302. Front-end receive circuit 302 represents the circuit that is capable of correctly clocking in, responsive to a setting of a mode signal 312, either fiber channel loop data or point-to-point data. In one embodiment, mode signal 312 may be implemented as a binary signal. The operation of front-end receive circuit 302 is discussed in greater detail in FIG. 4 herein. Front-end receive circuit outputs data to a 20-bit wide bus, which is then decoded by a 20-16 decoder 304 as shown. Decoder 304 is implemented by a conventional table look-up technique in one embodiment.

A data input 321 of an elasticity FIFO 320 is coupled to receive the decoded 16-bit parallel data out of decoder 304 via the 16 bit bus 316. A data output 322 of elasticity FIFO 320 is coupled to provide a FIFO output signal to a multiplexer 326, a loop control block 356, and a receive buffer 352. A first clock input 323a of elasticity FIFO 320 is coupled to receive a first receive clock signal, which is derived by SER/DE 220 from data out of input 204, via first receive clock input 234 of DMCC 230. A second clock input 323b of elasticity FIFO 320 is coupled to receive a transmit clock (which may be derived by dividing Xmit clock 238 by two, for example).

If the communication mode is point-to-point, the data output from elasticity FIFO 320 is input into receive buffer 352 for subsequent receipt by host computer 100 (via DMA engine 353 and bus 102). This is because, as stated earlier, point-to-point communication does not require the ability to pass through data received from input 231. The first and/or second receive clock signal permit elasticity FIFO to synchronize the received data at input 204 (which is in the receive clock domain), with the clock of receive buffer 352 to facilitate data transfer to the host.

On the other hand, if the communication mode is fiber channel loop, elasticity FIFO 320 cooperates with insert/delete logic 324 to provide elasticity between the deserialized fiber channel signal received at input 231 and the fiber channel transmit signal transmitted from output 232 of DMCC 230. The deserialized fiber channel input signal, received at input 231, is synchronized to the receive clock signals derived from serializer/deserializer 220. Meanwhile, the fiber channel output signal transmitted from output 232, being in the transmit domain, is synchronized to transmit clock generator 239 (e.g., a clock crystal circuit). In one embodiment, clock generator circuit 239 generates a 53.1 MHz clock signal, which is employed to clock out 2 10-bit bytes every clock cycle. Accordingly, 10 bit is output at the frequency of 106 MHz. After being serialized, the data rate for the serial data is 1.06 Gbits/second, which conforms to the requirements of the fiber channel loop specification.

Ideally, the receive clock signals and the transmit clock signal should be synchronous with each other. However, the first and second receive clock signals, derived from serializer/deserializer 220, are not perfectly synchronous with the transmit clock signal provided by transmit clock generator 239. By way of example, a tolerance of about of ±0.003% or more is not uncommon.

In the fiber channel loop communication mode, elasticity FIFO 320 cooperates with insert/delete logic 324 to insert or delete non-critical (i.e., dummy) data into the data stream in elasticity FIFO 320 in order to synchronize the deserialized fiber channel input signal, received at input 231, with the fiber channel output signal provided at output 232 (e.g., to facilitate passing data through). The non-critical data may be inserted or deleted, for example, between data frames. In this manner, data may be input into FIFO 320 in the receive clock domain and output therefrom in the transmit clock domain. In an embodiment of the present invention, there may be up to six fill words between each frame of data. Fill words comprise non-critical data and includes, for example, no operation (NOS) signals, off line (OLS) signals, and other redundant non-critical data signals. FIFO 320 is typically sized appropriately taken into account the data rate on the loop.

DMCC 230 further includes a data select multiplexer 326 for outputting data when the communication mode is fiber channel loop (the transmission of point-to-point data, which is discussed later herein, employs a separate path which includes a transmit buffer 354, a transmit point-to-point control circuit 372, a D-flip flop 374, a 8-bit-to-10-bit encoder 376, and output multiplexer 378). Data select multiplexer 326 includes a first multiplexer input 328, a second multiplexer input 330, a third multiplexer input 332, and a fourth multiplexer input 334, and a multiplexer output 342. Multiplexer output line 342 is coupled to an encoder circuit 344, which encodes the 16-bit data into 20-bit wide data for input into multiplexer 378 for subsequent output (with the appropriate setting of mode signal 312) on output 232.

The selection of which data input is coupled to output 342 of multiplexer 326 is determined by data provided via a multiplexer control input 340. As shown in FIG. 3A, first multiplexer input 328 of data select multiplexer 326 is coupled to receive a 16-bit signal from an output of insert/delete logic 324. Insert/delete logic 324 generates, in one embodiment, fill characters (e.g., IDLE) to the loop to compensate for the clock skew between receive and transmit clocks.

Second multiplexer input 330 is coupled to receive a signal from an output of a primitive signal sequence generator 350. Primitive signal sequence generator 350, which is part of loop control circuit 390, represents the circuitry responsible for assembling certain primitives for transmission on the loop, thereby alleviating processor 360 (the CPU) of this task. In one embodiment primitive signal sequence generator 350 may be employed to generate certain fillword primitives (such as no operation, offline, and others). The primitives are generated to satisfy the requirements of the arbitration loop protocol rules, which typically require that only valid primitive signals or characters be transmitted on the fiber channel loop. In one embodiment, primitive signal sequence generator 350 may be coupled to a DRAM 242 to generate the OPEN primitive on behalf of the host computer. This aspect has been discussed in detail in the aforementioned co-pending patent application (Attorney Docket No. P1802/SUN1P111). Primitive signal sequence generator 350 may also be employed, in one embodiment, to assemble data to be transmitted into the primitive format for transmission on the loop.

Third multiplexer input 332 is coupled to receive data from output 322 of elasticity FIFO 320. As mentioned earlier, the data received at third multiplexer input 332 typically represents data received from the loop after it has been processed via SER/DE 220, front-end receive circuit 302, decoder 304, and elasticity FIFO 320. If this third multiplexer input 332 is selected, the data received at input 204 is simply passed through DMCC 230 to another node on the fiber channel loop (e.g., in the case wherein the data received at input 204 represents a primitive destined for another node on the loop).

Fourth multiplexer input 334 is coupled to receive a data signal from an output of a transmit buffer 354. By selecting fourth multiplexer input 334 (by providing appropriate data on multiplexer control input 340) multiplexer 326 may output data from transmit buffer 354 (which in turn receives its data from the host computer) to multiplexer output 342 and subsequently to output 232 of DMCC 230. Multiplexer control input 340 is coupled to receive a control signal from a control output 357 of loop logic block 356 Logic block 356 contains control logic to select the appropriate output to go to loop.

Figure 1:
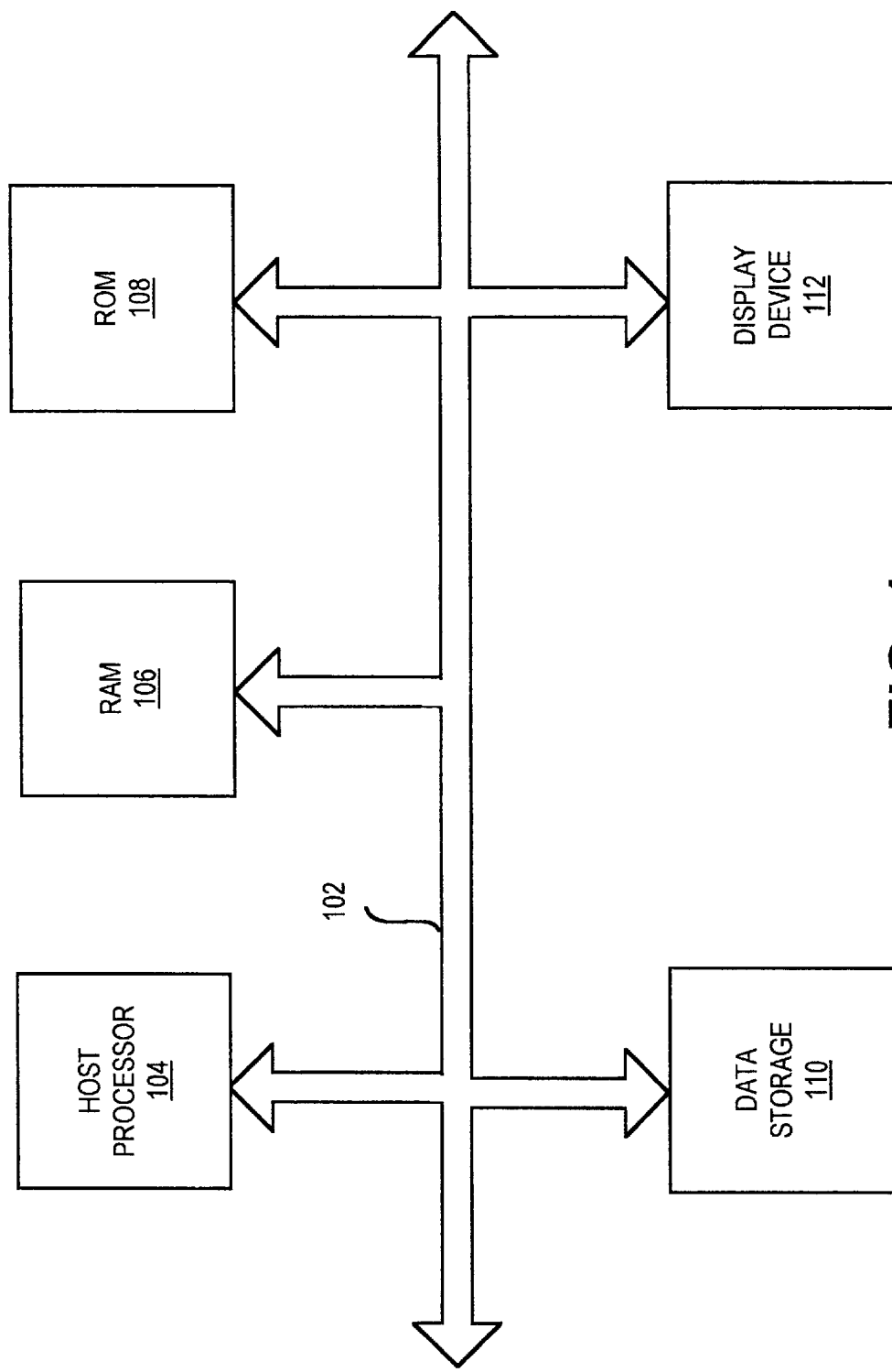
FIG. 1 is a block diagram of a host computer system, representing a host electronic device suitable for use with the inventive dual mode communication controller.
Figure 2A:
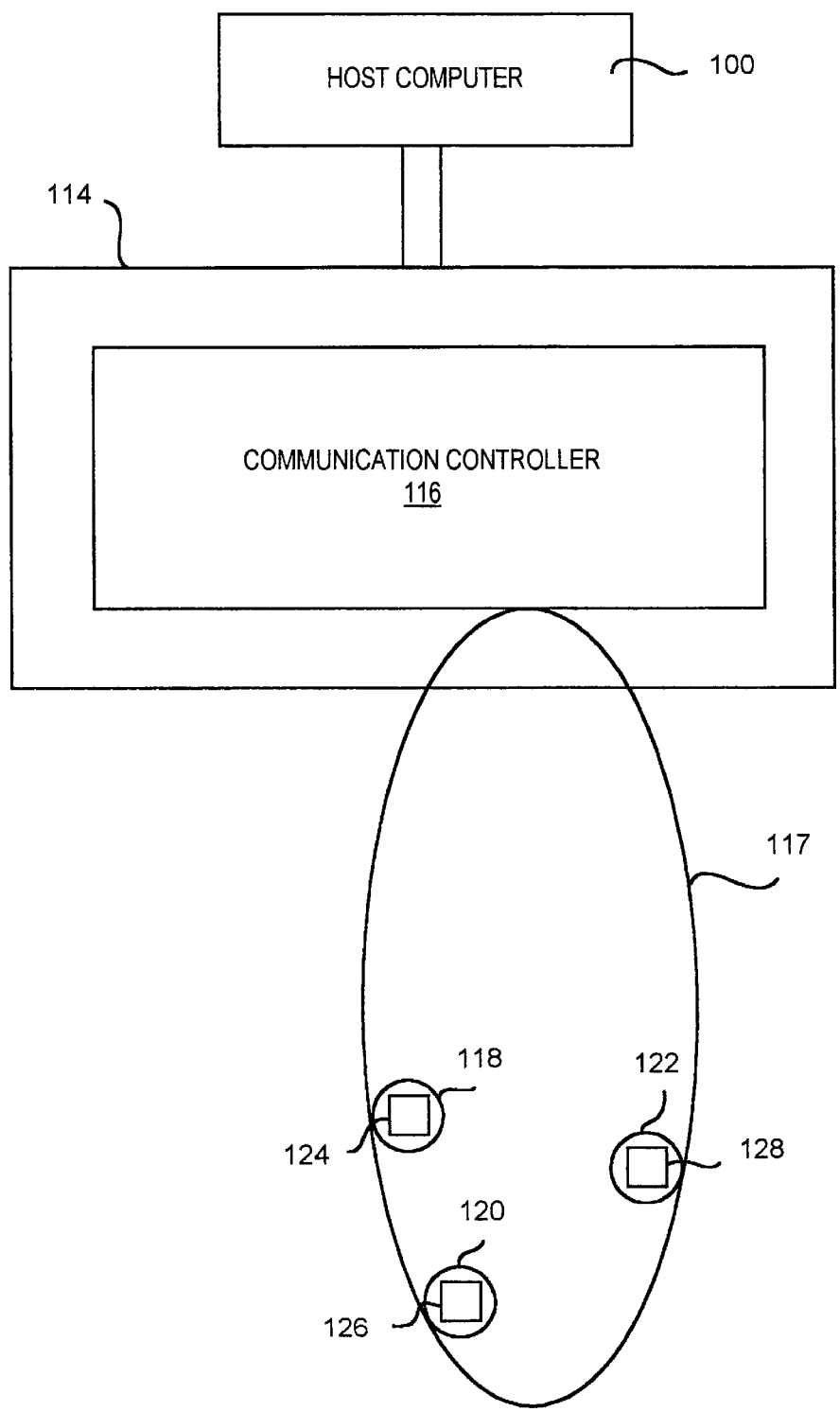
FIG. 2A illustrates the fiber channel loop communication methodology in which the host device is coupled to other devices via the fiber channel loop.
Figure 2B:
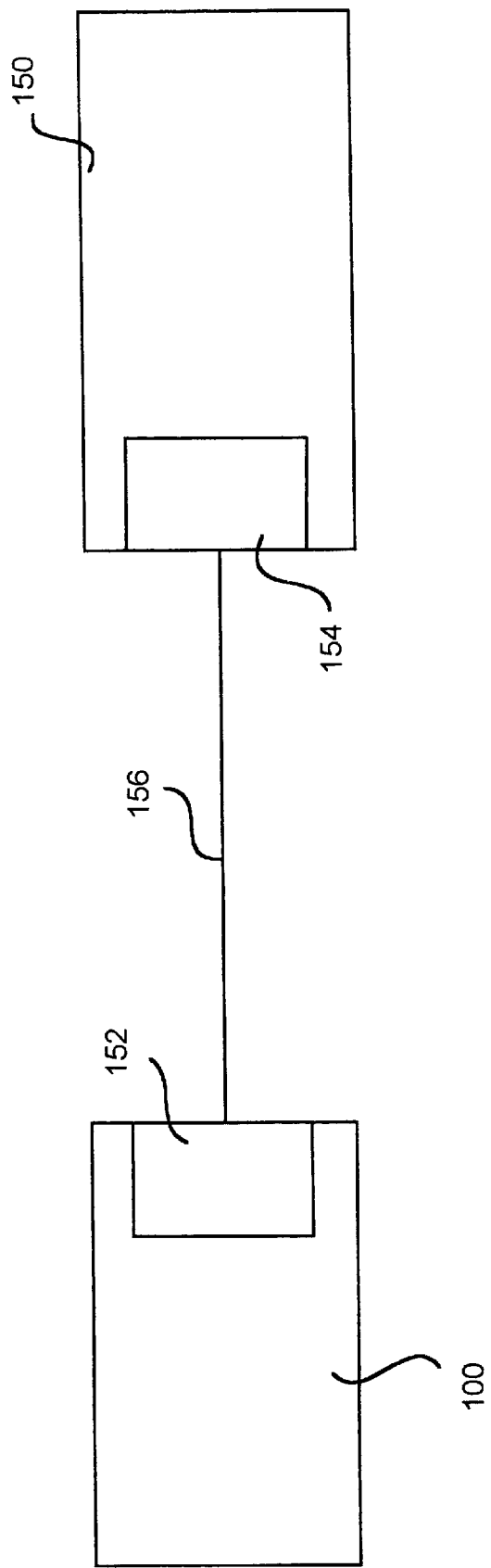
FIG. 2B illustrates the point-to-point communication methodology in which the host device is coupled to other devices via the dedicated point-to-point communication channel.

In either communication mode, transmit buffer 354 is used to buffer data to be transmitted from the host computer to output 232 of DMCC 230. Analogously, receive buffer 352 is used to buffer data received from input 204 (after it has been processed via SER/DE 220, front-end receive circuit 302, decoder 304, and elasticity FIFO 320). As shown in FIG. 3A, these buffers are coupled to direct memory access (DMA) engine 353 for coupling to host memory (e.g., RAM 106 of FIG. 1) via bus 102 (which may be, for example, a SCSI bus or an S-bus).

In FIG. 3A, there is shown a processor 360, representing the processor responsible for overseeing the data transmission process between the host computer and its target device as well as the general functioning of the communication controller chip. By way of example, processor 360 may be responsible for general environmental functions (such as performance monitoring and error checking) as well as interface functions (e.g., by displaying data to diodes or a display screen to inform the computer user of the communication status).

Processor 360 of DMCC 230 is shown coupled to an external RAM/ROM interface 351 to communicate with DRAM 242 and EPROM 240 via a bus 237. EPROM 240 typically stores data for initializing DMCC 230 upon startup. DRAM 242 stores, among others, data for transmission from the host computer to the device(s) to output 232. In one embodiment, the data to be transmitted actually resides in host memory 106 and only pointers (which may be organized as linked lists) thereto are stored in DRAM 242 to reduce the amount of storage required on the host adapter card (which minimizes the area/costs required for implementing the host adapter card).

By way of example, if the host computer would like to output data to a particular node in the fiber channel loop mode, it may simply provide the address and the node identity so that the Arbitrated Loop Physical Address (ALPA) of the target device and pointers thereto can be constructed (e.g., by I/O processor 360) within DRAM 242. DRAM 242 and/or EPROM 240 may be implemented as circuits external to DMCC 230 (as shown in FIG. 3A) or it may be provided within the ASIC that implements DMCC 230.

Host memory 106 is accessible to DMCC 230 via bus 102. With reference to the fiber channel loop mode, once mastership of the loop is achieved and the destination node is in the proper state (e.g., OPENED) for receiving data, I/O processor 360 may instruct loop logic block 356 to select multiplexer input 334 to permit data to be sent from transmit buffer 354 to DMCC output 232 (via encoder 344). This data is typically obtained directly from host memory 106 by DMA engine 353 in accordance to the list of pointers within DRAM 242. Prior to transmission, the data may be encoded into frames suitable for transmission on the loop. In one embodiment, a frame may include, for example, up to about 2400 bytes of data.

A proper state of mode signal 312 (shown coupled to the control input of output multiplexer 378) ensures that fiber loop data output by encoder 344 is output on DMCC output 232. It should be understood that prior to being put on the fiber channel loop, the 10-bit parallel data out of multiplexer 232 may be serialized using a conventional serializer/deserializer circuit to ensure that the output is in the serial format suitable for transmission on the fiber channel loop.

On the other hand, if the transmission mode is point-to-point, data received from the host computer (typically from host memory 106 via DMA engine 353 under the supervision of processor 360) is input into transmit buffer 354. A proper control signal from loop logic block 356 ensures that this data is output to transmit point-to-point control 372 instead to multiplexer 326 (which, as discussed earlier, is employed for transmitting fiber channel loop data). In one embodiment, this control signal may represent the aforementioned mode signal 312 and may be, in one embodiment, directly provided to transmit buffer 354.

Figure 3B:
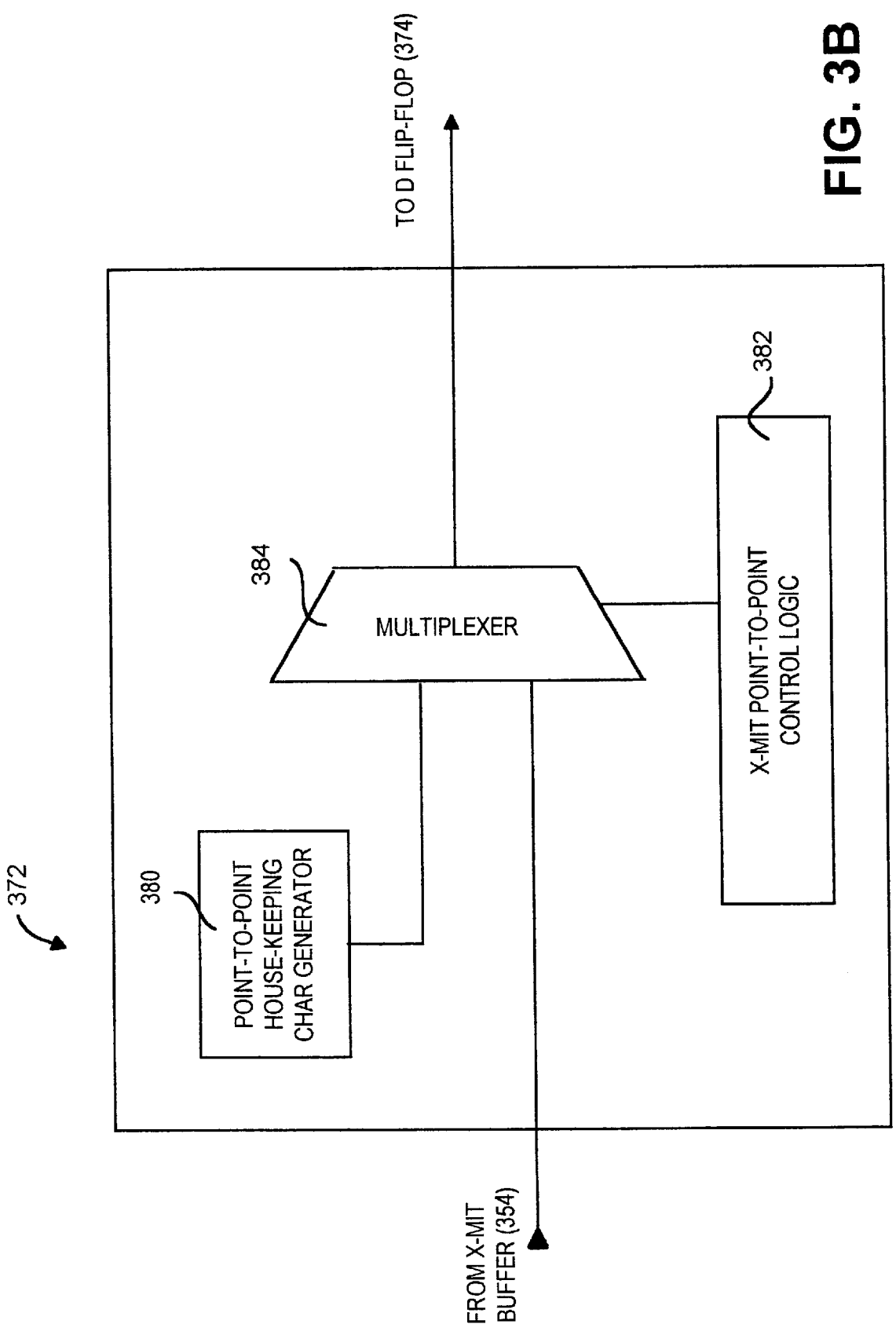

Transmit point-to-point control circuit 372 is configured to read data 8-bit at a time from the 16-bit wide bus out of transmit buffer 354. Point-to-point control block 372 may also inject characters (e.g., RECEIVE-READY and IDLE) onto the point-to-point communication channel. FIG. 3B illustrates in greater detail, in accordance with one aspect of the present invention, transmit point-to-point control circuit 372. Since the transmit buffer (354) contains only the actual data to be transmitted, house-keeping characters necessary for synchronizing the communication are provided by point-to-point house keeping character generator 380. In one embodiment, point-to-point house keeping character generator 380 is responsible for generation characters such as IDLE, RECEIVE_READY, OLS, and the like. A Transmit point-to-point control logic 382 controls whether multiplexer 384 should transmit to D flip-flop 374 data from point-to-point house keeping character generator 380 to synchronize communication or the actual data from transmit buffer 354.

The 8-bit wide output from transmit point-to-point control circuit 372 is input into a D-flip flop 374, which is employed to clock point-to-point data out to a 8-bit-to-10-bit encoder 376 so that transmission can be synchronized to the frequency of the point-to-point communication channel (e.g., 53.1 MHz or 26.6 MHz, in some embodiments). Transmit clock 2, which is employed to clock data out of D-flip flop 374, may be derived from crystal circuit 379 via a proper divider circuit, for example.

The output of encoder 376, which encodes 8-bit data out of D-flip flop 374 into 10-bit wide data, is input into output multiplexer 378. A proper state of mode signal 312 (shown coupled to the control input of output multiplexer 378) ensures that point-to-point data output by encoder 376 is output on DMCC output 232. Encoder 376, as well as other encoders of FIG. 3A, may be implemented by, for example, look up tables (a conventional technique). It should be understood that prior to being put on the point-to-point communication channel, the 10-bit parallel data out of output 232 may be serialized using a conventional serializer/deserializer circuit to ensure that the output is in the serial format suitable for transmission on the point-to-point communication channel. The selection of an appropriate conventional SER/DE circuit for use with either the point-to-point communication mode, the fiber loop communication mode or both is well within the skills of those skilled in the art.

Figure 4:
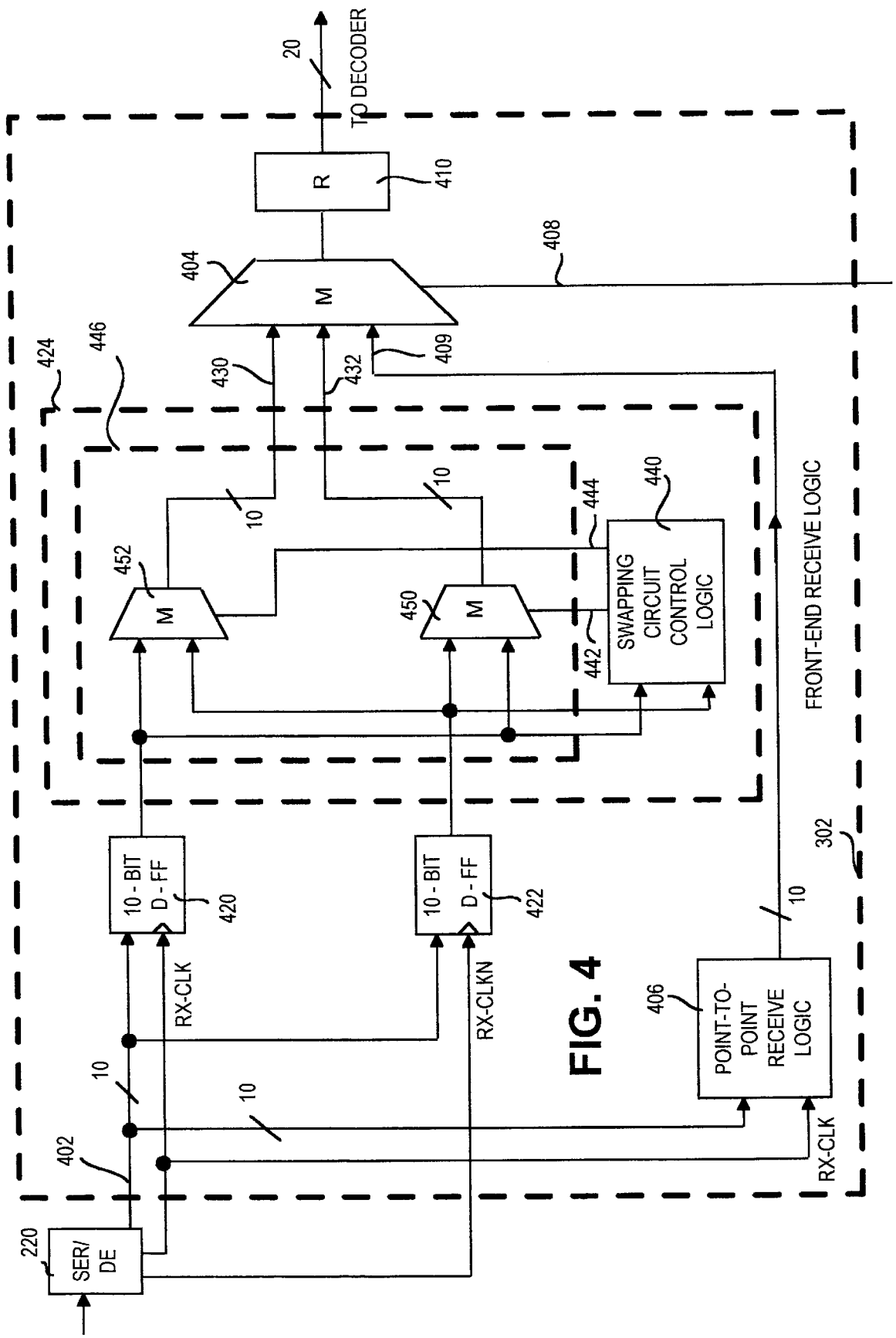
FIG. 4 is a block diagram illustrating, in accordance with one embodiment of the invention, the front-end receive circuit of the dual mode communication controller of FIG. 3A.

FIG. 4 illustrates, in accordance with one aspect of the present invention, front-end receive logic 302 which is capable of clocking in either fiber channel loop data or point-to-point data from SER/DE 220 of FIG. 3A. In accordance with one aspect of the present invention, front-end receive logic 302 is configured such that it is compatible with any conventional SER/DE chip (thereby yielding important cost saving advantages) that is capable of providing 10-bit parallel data output and a pair of complementary clock signals from the received serial data. Referring now to FIG. 4, front-end receive logic 302 includes an input data port 402, which is coupled to the output of SER/DE 220 to receive 10-bit parallel data.

Figure 5A:
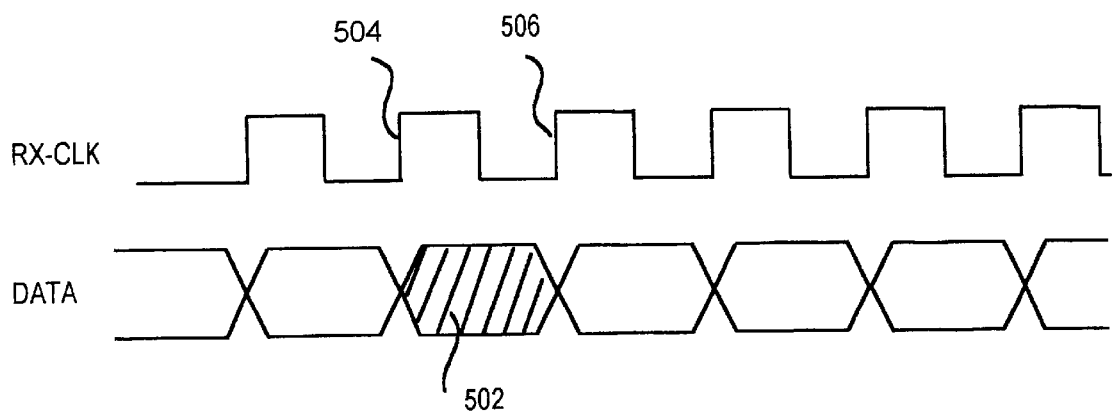
FIG. 5A illustrates, to facilitate discussion of the point-to-point data, a few exemplary point-to-point data cycles with reference to receive clock RX_CLK.

As mentioned, SER/DE 220 may be coupled to either the fiber channel loop or the point-to-point communication channel (depending on the communication mode). Fiber channel loop data is different in its data rate and format from point-to-point data. To illustrate, FIG. 5A depicts a timing diagram for a few exemplary data cycles of point-to-point data. In general, point-to-point data is transmitted in 10-bit frames, with a data cycle being valid for every cycle of the receive clock RX_CLK. In the example of FIG. 5A, the data cycle is valid starting with every low-to-high transition of the receive clock RX_CLK. By way of example, data 502 is valid between low-to-high transitions 504 and 506 of the receive clock RX_CLK.

Figure 5B:
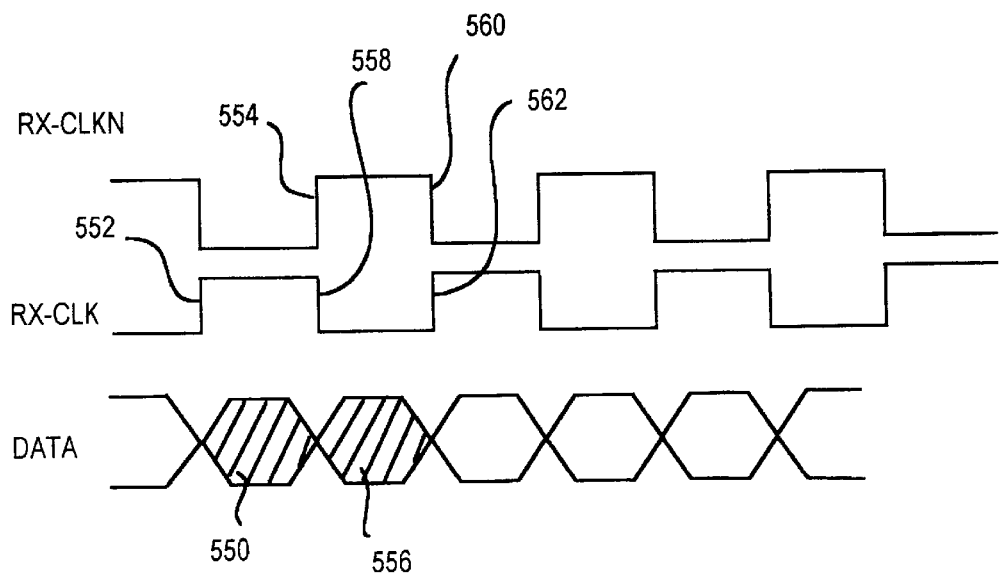
FIG. 5B illustrates, to facilitate discussion of the fiber channel loop data, a few exemplary fiber channel loop data cycles with reference to receive clock RX_CLK and complementary receive clock RX_CLKN.

In contrast, FIG. 5B depicts a timing diagram for a few exemplary data cycles of fiber channel loop data. In general, fiber channel loop data is transmitted in 4 frames of 10-bit each. The four frames make up a primitive, which may be used to carry commands (e.g., ARBITRATE, OPEN, CLOSE) or data. Further, the data cycle is valid twice for every cycle of the receive clock RX_CLK. By way of example, data cycle 550 is valid in the ½ cycle of the receive clock RX_CLK starting from low-to-high transition 552. This data cycle 550 ceases to be valid at the next high-to-low transition 558 of the receive clock RX_CLK (or at the next low-to-high transition 554 of the complementary receive clock signal RX_CLKN).

Data cycle 556 is valid in the ½ cycle of the receive clock RX_CLK starting from high-to-low transition 558 of the receive clock RX_CLK (or at the low-to-high transition 554 of the complementary receive clock signal RX_CLKN). This data cycle 556 ceases to be valid at the next low-to-high transition 562 of the receive clock RX_CLK. As can be seen, a fiber channel loop data cycle is valid every ½ clock cycle starting from the low-to-high transitions of receive clock signal RX_CLK and of complementary receive clock signal RX_CLKN.

Depending on the type of data received (fiber channel loop or point-to-point), front-end receive logic 302 employs multiplexer 404 to correctly clock out the data in the 20-bit parallel format for use by decoder 304 of FIG. 3A. If SER/DE 220 is coupled to a point-to-point communication channel (thereby inputting point-to-point data into front-end receive logic 302), the input data is already coupled to a point-to-point receive logic 406 as shown. Point-to-point receive logic 406 employs the receive clock RX_CLK to clock out data (10-bit at a time synchronized to the receive clock RX_CLK) to input 409 of multiplexer 404. A control signal 408 is then employed to control multiplexer 404 to allow the point-to-point data on input 409 to be output from multiplexer 404. The control signal 408 may be derived from, for example, a selectable user input (e.g., a jumper to either rail voltages or a software-controlled input) for indicating which mode of operation front-end receive logic 302 is currently in. The 10-bit data may be accumulated in a register 410 to be clocked out 20-bit at a time to the 20-bit-to-16-bit decoder 304 of FIG. 3A.

If SER/DE 220 is coupled to a fiber channel loop (thereby inputting loop data into front-end receive logic 302), the input data is routed to a fiber loop channel receive logic that includes a 10-bit D flip flop 420, a 10-bit D flip flop 422, and a swapping circuit 424. 10-bit D flip flop 420 clocks in the received 10-bit data by receive clock RX_CLK while 10-bit D flip-flop 422 clocks in the receive 10-bit data by complementary receive clock RX_CLKN. In this manner, two data cycles are clocked in for every cycle of the receive clock RX_CLK, which conforms to the specification of the fiber channel loop data as discussed in connection with the aforementioned FIG. 5B.

Figure 6:
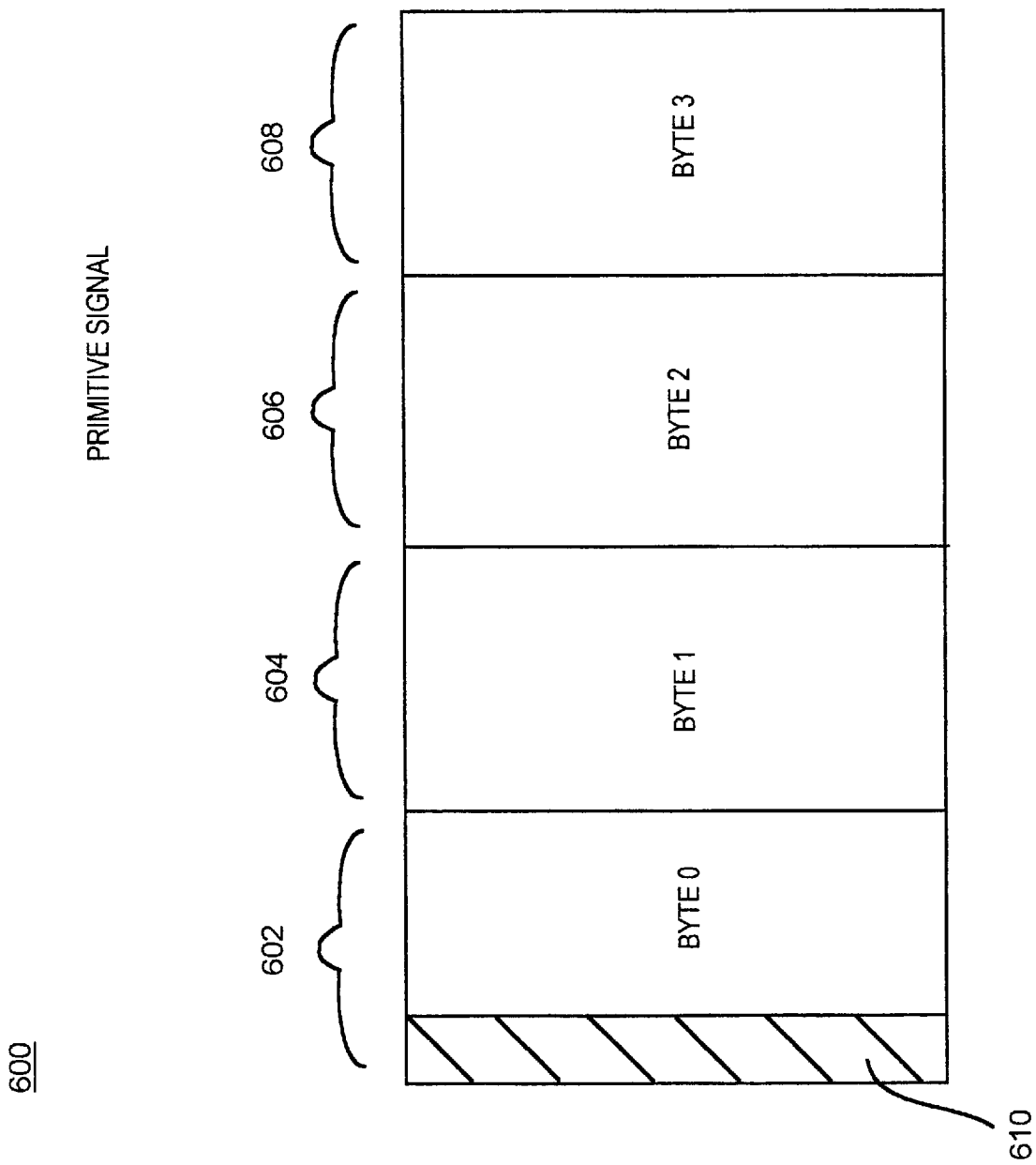
FIG. 6 illustrates, to further facilitate discussion of the fiber channel loop data, a 4-byte primitive including the data sentinel that signals the start of the primitive.

The outputs of D flip flops 420 and 422 are input into a swapping circuit 424, whose function is to ensure that the received 4-byte primitive is assembled in the correct order upon being output from front-end receive logic 302. To facilitate discussion of this aspect of the present invention, FIG. 6 illustrates a block diagram of primitive signal 600, representing a typical fiber channel loop primitive. Also to facilitate discussion, assume that primitive signal 600 represents an ARBITRATION primitive signal although primitive signal 600 may be employed to represent any other fiber channel loop signal, e.g., CLOSE, OPEN, data, or the like.

Primitive signal 600 includes a first byte 602, a second byte 604, a third byte 606, and a fourth byte 608. First and second bytes 602 and 604 typically identify the signal type that primitive signal 600 represents, e.g., an ARBITRATION primitive signal in this case. First and second bytes 602 and 604 may be used to differentiate the type of primitive signal (e.g., Open, Arbitrate, Close, and the like). If the primitive represents another signal, the signal type is also identified by a proper identifier in first and second bytes 602 and 604. Third and fourth bytes 606 and 608 typically indicate the arbitration loop physical address, ALPA, of the initiator of primitive signal 600, and if appropriate, of the target device. The ALPA of the target device may be omitted for certain primitive signals, e.g., ARBITRATION, in which the primitives are destined to travel around the loop (and received back at the initiator if arbitration is successful) without targeting any device on the loop in particular.

At the start of each primitive, there is shown a data sentinel 610, representing a predefined arbitrary data sentinel to signal to the receiving device that the next four bytes form the complete primitive. In one embodiment, data sentinel 610 may take on the value of, for example, 0fa(h). Since byte 0 (602) can be received in either the first half of the receive clock RX_CLK or the second half of the receive clock RX_CLK (there are two data cycles for each cycle of receive clock RX_CLK, as discussed earlier), this data sentinel may be clocked into either D flip flop 420 or D flip flop 422 of FIG. 4. Swapping circuit 424 ensures that irrespective which D flip flop clocks in the data sentinel, the byte that encapsulates that data sentinel, e.g., byte 0 (602 of FIG. 6) is still input into input leg 430 of multiplexer 404 in order for the complete 4-byte primitive to be correctly assembled upon being output from front-end receive logic 302.

With reference to FIG. 4, swapping circuit control logic 440 of swapping circuit 424 receives the two pieces of 10-bit data from both D flip flops 420 and 422. The two pieces of 10-bit data from both of these D flips flops are then examined to determine which, if any, has clocked in the byte that contains the data sentinel. Upon detecting the data sentinel, swapping circuit control logic 440 then provides appropriate values on control inputs 442 and 444 into swapping subsystem 446 to allow the data byte containing the data sentinel to be output on line 430.

In the example of FIG. 4, swapping subsystem 446 is implemented by a pair of multiplexers 450 and 452 whose outputs are controlled by respective control inputs 442 and 444 of swapping subsystem 446 (the control inputs 442 and 444 are output by swapping circuit control logic 440 as mentioned). By providing either 1/0 or 0/1 on respective inputs 442 and 444, multiplexer 452 is controlled to output the data byte clocked in by either D flip flop 422 or D flip flop 424. In this manner, irrespective whether the data byte containing the data sentinel is clocked in by D flip flop 422 or D flip flop 424, swapping circuit 424 ensures that the data byte is properly output into input leg 430 in order for the 4-byte primitive to be correctly assembled upon being output from front-end receive logic 302.

Control input 408, which is derived from the user selectable mode control signal and an appropriate conventional control circuit, then alternately selects input 432 and 430 until the entire 4-byte primitive is received. As before, the 10-bit data output from multiplexer 202 may be accumulated in register 410 prior to being input, 20-bit at a time, into decoder 304 of FIG. 3A.

While this invention has been described in terms of several preferred embodiments, there are alterations, permutations, and equivalents which fall within the scope of this invention. By way of example, although the point-to-point data and fiber channel loop data, as well as the devices that operate thereon, have been discussed with reference to specific byte sizes and specific number of parallel bits (e.g., 8 bits, 10 bits, 20 bits, and the like), the inventive concepts discussed herein are not limited to such specific implementations. It is therefore intended that the following appended claims be interpreted as including all such alterations, permutations, and equivalents as fall within the true spirit and scope of the present invention.

What is claimed is:

1. In a host adapter circuit configured for coupling a host electronic device with one of a fiber channel loop and a point-to-point communication channel, a method for receiving data at said host adapter circuit from one of said fiber channel loop and said point-to-point communication channel, comprising:

providing a selectable control signal configured for indicating whether said host adapter circuit is coupled to said fiber channel loop or said point-to-point communication channel;

providing a front-end receive circuit, said front-end receive circuit being configured for coupling with an input data port, said input data port representing one of said fiber channel loop and said point-to-point communication channel;

coupling said front-end receive circuit with said selectable control signal; and coupling an output of said front-end receive circuit with a decoder of said host adapter circuit, wherein said front-end receive circuit is configured to process, responsive to said selectable control signal, either fiber channel loop data from said fiber channel loop or point-to-point data from said point-to-point communication channel from said input data port to provide parallel data having a predefined size to said decoder circuit.

2. The method of claim 1 wherein said providing said front-end receive circuit further comprising:

coupling a first clock signal with a point-to-point receive circuit of said front-end receive circuit, said first clock signal representing a clock signal obtained from said input data port;

coupling an input of a point-to-point receive circuit with said input data port for receiving said point-to-point data when said host adapter circuit is coupled to said point-to-point communication channel; and coupling an output of said point-to-point clock out circuit with a first multiplexer of said front-end receive circuit, wherein said point-to-point receive circuit is configured to clock out said point-to-point data to said first multiplexer once every clock cycle of said first clock signal.

3. The method of claim 2 wherein said decoder circuit is a 10 bit-to-20 bit decoder.

4. The method of claim 3 wherein said front-end receive circuit is configured to clock out said point-to-point data to said decoder every two cycles of said first clock signal.

5. The method of claim 2 wherein said providing said front-end receive circuit further comprising:

providing a fiber channel loop receive circuit;

coupling said first clock signal to a first clock input of said fiber channel loop receive circuit;

coupling said second clock signal to a second clock input of said fiber channel loop receive circuit;

coupling said input data port to said fiber channel loop receive circuit; and coupling a first and second output ports of said fiber channel loop receive circuit with said first multiplexer, wherein said fiber channel loop receive circuit is configured to clock out said fiber channel loop data to said first multiplexer twice for every cycle of said first clock signal.

6. The method of claim 5 wherein a rising edge of said first clock signal and a rising edge of said second clock signal are employed to clock out said fiber channel loop data to said first multiplexer.

7. The method of claim 6 wherein said coupling said front-end receive circuit with said selectable control signal includes coupling a control input of said first multiplexer with said selectable control signal.

8. The method of claim 6 wherein said providing said fiber channel loop receive circuit includes:

coupling said input data port of said fiber channel loop receive circuit with an input of a first 10-bit D-flip flop;

coupling said input data port of said fiber channel loop receive circuit with an input of a second 10-bit D-flip flop to permit said first and second 10-bit D-flip flops to receive said fiber channel loop data in 10-bit chunks; and coupling outputs of said first and second D-flip flops to a swapping circuit of said front-end receive circuit, said swapping circuit being configured to output a data sentinel detected in said fiber channel loop data to a first input of said first multiplexer irrespective whether said data sentinel is output from said first 10-bit D-flip flop or said second 10-bit D-flip flop.

9. The method of claim 8 said coupling said outputs of said first and second D-flip flops to said swapping circuit includes:

providing a swapping circuit control logic;

coupling inputs of said swapping circuit control logic to outputs of said first and second 10-bit D-flip flops to enable said swapping circuit control logic to detect said data sentinel from said outputs of said first and second 10-bit D-flip flops;

providing a swapping subsystem, a first input of said swapping subsystem being coupled to said output of first 10-bit D-flip flop, a second input of said swapping subsystem being coupled to said output of second 10-bit D-flip flops, a first output of said swapping subsystem being coupled to said first input of said first multiplexer, a second output of said swapping subsystem being coupled to a second input of said first multiplexer; and coupling an output of said swapping circuit control logic to said swapping subsystem, wherein said swapping subsystem is configured to output said data sentinel, if detected by swapping circuit control logic, from said first output of said swapping subsystem irrespective whether said data sentinel is detected at said output of said first 10-bit D-flip flop or at said output of said second 10-bit D-flip flop.

10. A host adapter circuit configured for coupling a host electronic device with one of a fiber channel loop and a point-to-point communication channel, said host adapter circuit being configured for receiving data from one of said fiber channel loop and said point-to-point communication channel, comprising:

- a selectable control signal configured for indicating whether said host adapter circuit is coupled to said fiber channel loop or said point-to-point communication channel;
- a front-end receive circuit coupled to said selectable control signal, said front-end receive circuit being configured for coupling with an input data port, said input data port representing one of said fiber channel loop and said point-to-point communication channel; and
- a decoder coupled to an output of said front-end receive circuit, wherein said front-end receive circuit is configured to process, responsive to said selectable control signal, either fiber channel loop data from said fiber channel loop or point-to-point data from said point-to-point communication channel from said input data port to provide parallel data having a predetermined size to said decoder circuit.

11. The host adapter circuit of claim 10 wherein said front-end receive circuit further comprising:

- a point-to-point receive circuit coupled to a first clock signal, said first clock signal representing a clock signal obtained from said input data port, said point-to-point receive circuit being configured to receive said point-to-point data when said host adapter circuit is coupled to said point-to-point communication channel; and
- a first multiplexer coupled to an output of said point-to-point clock out circuit, wherein said point-to-point receive circuit is configured to clock out said point-to-point data to said first multiplexer once every clock cycle of said first clock signal.

12. The host adapter circuit of claim 11 wherein said decoder circuit is a 20 bit-to-16 bit decoder.

13. The host adapter circuit of claim 12 wherein said front-end receive circuit is configured to clock out said point-to-point data to said decoder every two cycles of said first clock signal.

14. The host adapter circuit of claim 11 wherein said frontend receive circuit further comprising:

- a fiber channel loop receive circuit coupled to said input data port, said fiber channel loop receive circuit including a first clock input and a second clock input, said first clock input of said fiber channel loop receive circuit being coupled to said first clock signal, said second clock input of said fiber channel loop receive circuit being coupled to said second clock signal, said fiber channel loop receive circuit further including a first output port and a second output port coupled to said first multiplexer, wherein said fiber channel loop receive circuit is configured to clock out said fiber channel loop data to said first multiplexer twice for every cycle of said first clock signal.

15. The host adapter circuit of claim 14 wherein a rising edge of said first clock signal and a rising edge of said second clock signal are employed to clock out said fiber channel loop data to said first multiplexer.

16. The host adapter circuit of claim 15 wherein said control input of said first multiplexer is coupled with said selectable control signal.

17. The host adapter circuit of claim 15 wherein said fiber channel loop receive circuit includes:

- a first 10-bit D-flip flop having an input coupled to said input data port of said fiber channel loop receive circuit;
- a second 10-bit D-flip flop having an input coupled to said input data port of said fiber channel loop receive circuit, wherein said first and second 10-bit D-flip flops are configured to receive said fiber channel loop data in 10-bit chunks; and
- coupling outputs of said first and second D-flip flops to a swapping circuit of said front-end receive circuit, said swapping circuit being configured to output a data sentinel detected in said fiber channel loop data to a first input of said first multiplexer irrespective whether said data sentinel is output from said first 10-bit D-flip flop or said second 10-bit D-flip flop.

18. The host adapter circuit of claim 17 wherein said swapping circuit includes:

- a swapping circuit control logic having inputs coupled to outputs of said first and second 10-bit D-flip flops to enable said swapping circuit control logic to detect said data sentinel from said outputs of said first and second 10-bit D-flip flops; and
- a swapping subsystem coupled to an output of said swapping circuit control logic, a first input of said swapping subsystem being coupled to said output of first 10-bit D-flip flop, a second input of said swapping subsystem being coupled to said output of second 10-bit D-flip flops, a first output of said swapping subsystem being coupled to said first input of said first multiplexer, a second output of said swapping subsystem being coupled to a second input of said first multiplexer, wherein said swapping subsystem is configured to output said data sentinel, if detected by swapping circuit control logic, from said first output of said swapping subsystem irrespective whether said data sentinel is detected at said output of said first 10-bit D-flip flop or at said output of second 10-bit D-flip flop.

19. A host adapter circuit configured for coupling a host electronic device with one of a fiber channel loop and a point-to-point communication channel for receiving data at said host adapter circuit from one of said fiber channel loop and said point-to-point communication channel, comprising:

- means for indicating whether said host adapter circuit is coupled to said fiber channel loop or said point-to-point communication channel;
- means coupled to said indicating means for receiving first data from an input data port of said host adapter circuit, said input data port being configured to be coupled to one of said fiber channel loop and said point-to-point communication channel;
- means coupled to said indicating means for ascertaining whether said first data pertains to said host electronic device when said input data port is coupled to said fiber channel loop; and
- means for passing said first data to said fiber channel loop if said first data is ascertained not to pertain to said electronic device when said input data port is coupled to said fiber channel loop.

20. The host adapter circuit of claim 19, further comprising:

- means for receiving said first data to said host electronic device if said first data is ascertained to pertain to said electronic device when said input data port is coupled to said fiber channel loop adapter circuit.

21. The host adapter circuit of claim 20 further comprising:

logic means coupled to said selectable control channel; and means, coupled to said logic means, for outputting second data from said host electronic device to said point-to-point communication channel when said host adapter circuit is coupled to said point-to-point communication channel.

* * * * *